(12) United States Patent
Tsai

(10) Patent No.: US 8,130,422 B2
(45) Date of Patent: Mar. 6, 2012

(54) IMAGE PROCESSING DEVICE AND METHOD THEREOF

(75) Inventor: Jui-Yuan Tsai, Tai Nan (TW)

(73) Assignee: Realtek Semiconductor Corp., Hsinchu (TW)

( * ) Notice: Subject to any disclaimer, the term of this patent is extended or adjusted under 35 U.S.C. 154(b) by 1199 days.

(21) Appl. No.: 11/892,393

(22) Filed: Aug. 22, 2007

(65) Prior Publication Data

US 2008/0062473 A1   Mar. 13, 2008

(30) Foreign Application Priority Data

Sep. 7, 2006 (TW) ................................ 95133004 A

(51) Int. Cl.
*H04N 1/38* (2006.01)

(52) U.S. Cl. ........ 358/466; 358/482; 358/443; 358/446; 341/120; 341/122; 348/207.99; 348/692; 345/72; 345/87

(58) Field of Classification Search .................. 358/466, 358/471, 448, 443, 446, 501, 482, 483; 341/156, 341/155, 166, 118, 120, 161, 172, 143, 122; 348/572, E5.062, 207.99, 725, E5.24, 692, 348/571; 345/72, 87

See application file for complete search history.

(56) References Cited

U.S. PATENT DOCUMENTS

| | | | | |
|---|---|---|---|---|
| 4,588,981 A * | 5/1986 | Senn | ............................. | 341/143 |
| 5,140,424 A * | 8/1992 | Yoshimura et al. | ........... | 348/620 |
| 5,371,552 A * | 12/1994 | Brummette et al. | .......... | 348/697 |
| 5,426,461 A * | 6/1995 | Ohara | ............................ | 348/254 |
| 5,534,916 A * | 7/1996 | Sakaguchi | ................ | 348/222.1 |
| 6,333,750 B1 * | 12/2001 | Odryna et al. | ................ | 345/629 |
| 6,563,478 B2 * | 5/2003 | Aoki | ............................... | 345/58 |
| 7,145,494 B2 * | 12/2006 | Mizuguchi et al. | ........... | 341/155 |
| 7,221,475 B1 * | 5/2007 | Ikeda | ............................ | 358/1.9 |
| 7,746,252 B2 * | 6/2010 | Mizuta | .......................... | 341/118 |
| 2002/0085104 A1 * | 7/2002 | Mizuno et al. | ................ | 348/294 |
| 2004/0207586 A1 * | 10/2004 | Tsai et al. | ...................... | 345/87 |
| 2004/0239545 A1 * | 12/2004 | Tsai et al. | ...................... | 341/155 |
| 2006/0181595 A1 * | 8/2006 | Ishikawa | ....................... | 347/130 |
| 2006/0284988 A1 * | 12/2006 | Wakui | ........................ | 348/222.1 |
| 2007/0040920 A1 * | 2/2007 | Kinoshita | .................... | 348/246 |
| 2008/0012956 A1 * | 1/2008 | Nihei et al. | ................. | 348/222.1 |
| 2008/0024842 A1 * | 1/2008 | Tsukahara et al. | ............ | 358/505 |
| 2008/0030620 A1 * | 2/2008 | Tsai et al. | ..................... | 348/572 |
| 2008/0032658 A1 * | 2/2008 | Tsai et al. | ..................... | 455/313 |
| 2008/0068467 A1 * | 3/2008 | Kanno et al. | ................ | 348/222.1 |
| 2009/0160968 A1 * | 6/2009 | Prentice et al. | ............ | 348/223.1 |

FOREIGN PATENT DOCUMENTS

EP   0498262 A2   8/1992

OTHER PUBLICATIONS

Analog Devices, Dual Interface for Flat Panel Displays, AD9887, pp. 1-56, 2001.
Analog Devices, Multiformat SDTV Video Decoder, ADV7183A, pp. 1-104.

\* cited by examiner

*Primary Examiner* — Negussie Worku
(74) *Attorney, Agent, or Firm* — Muncy, Geissler, Olds & Lowe, PLLC

(57) ABSTRACT

An image processing device is provided which comprises an input unit and an analog front end circuit with DC inputs. According to the invention, no capacitor is installed in the input unit and no clamper is installed in the AFE circuit with DC inputs. By appropriately selecting a comparing voltage and adding a level shifter or a compensation circuit, the invention can still generate an accurate digital signal.

16 Claims, 6 Drawing Sheets

IMAGE PROCESSING DEVICE AND METHOD THEREOF

BACKGROUND OF THE INVENTION

1. Field of the Invention

The invention relates to display systems, and more particularly, to an image processing device and method thereof.

2. Description of the Related Art

Traditionally, analog front end (AFE) circuits are applied to two categories of display systems. First, an AFE circuit applied to a liquid crystal display (LCD) controller without a decoder is used to receive three analog image signals R, G, B from a display card (e.g., VGA card) of a computer system. Second, an AFE circuit applied to a video decoder is used to receive a signal from a tuner or a DVD player. Where the signal can be divided into three video formats as follows. The first is a composite video signal, often called a CVBS signal, which combines the luminance (Y) and chrominance (C) signals into a single channel. The second is a separate video signal separating the luminance (Y) and the chrominance (C) signals. The third is a component video signal which is split into three separate signals Y, Pr, Pb.

Conventionally, AFE circuits perform AC-coupling and clamping. Take three analog image signals R, G, B sent from a display card for example. Since the DC components of these signals are unable to pass through AC-coupling capacitors, the AFE circuits usually utilize clampers to restore the DC voltage levels of the analog image signals. In general, AC-coupling and clamping are performed in order to restore the DC voltage levels of the analog image signals; however, it usually takes a while for the restored DC voltage levels to settle, thereby unable to reflect an immediate change in the DC voltage levels of the analog image signals.

According to video formats of the analog image signals received by the AFE circuits, the structures of clampers are basically divided into two types as follows.

The first is a voltage-type clamper, which is generally employed to process analog image signals R, G, B, or a component video signal (Y, Pr, Pb). The voltage-type clamper includes a switch SW in connection with a restored voltage $V_{res}$ and the operation of the switch SW is controlled by a clamping signal. The restored voltage $V_{res}$ will charge an AC-coupling capacitor up to a voltage level of $V_{res}$ as the switch SW is turned on.

The second is a current-type clamper, which is generally employed to process a component video signal (Y, Pr, Pb), a composite video signal or a separate video signal (Y, C). The current-type clamper is formed by two series connected switches SW1, SW2, which are respectively connected with two current sources I-up, I-dn. The operation of the switch SW1 is controlled by a clamping signal clamp_up while the operation of the switch SW2 is controlled by a clamping signal clamp_dn. A circuit designer can establish a DC voltage at a junction of the two series connected switches SW1, SW2 by adjusting pulse widths and conductive periods of the clamping signals (clamp_up, clamp_dn). Finally, the DC voltage at the junction of the two series connected switches SW1, SW2 charges the AC-coupling capacitor up to a desired voltage level.

In fact, no matter which type of clamper is selected, a problem that a change in the DC voltage levels of the analog image signals can not be reflected immediately will arise as long as the clamper operates in an image processing device with AC-coupling function. Further, if the analog image signals contain a Sync_on_Green (SOG) signal, the circuit will include an additional branch having an AC-coupling capacitor and a SOG circuit. After receiving the SOG signal, the SOG circuit restores the DC voltage level of the SOG signal and then extracts a sync signal from the SOG signal by using an internal auto-clamper. Where the extracted sync signal is a composite sync signal HS+VS containing a horizontal sync (HS) signal and a vertical sync (VS) signal. Likewise, with AC-coupling and clamping, the SOG branch has the same problem that a change in the DC voltage levels of the SOG signals can not be reflected immediately.

In addition to performing AC-coupling and clamping, conventional AFE circuits usually use input buffers to buffer restored DC voltage levels of the analog image signals and prevent restored DC voltage levels of the analog image signals from running. The input buffers, formed by analog circuits, have an input impedance of infinity and an output with high driving capability. However, installing an input buffer in an AFE circuit causes a problem which it is not easy to design an input buffer with high input impedance.

Accordingly, what is needed is an image processing device to address the above-identified problems. The invention addresses such a need.

SUMMARY OF THE INVENTION

In view of the above-mentioned problems, an object of the invention is to provide an image processing device in order to solve problems of taking time for the restored DC voltage levels of the analog image signals to settle and being not easy to design an input buffer with high input impedance.

To achieve the above-mentioned object, the image processing device of the invention is used to receive at least one analog image signal and generate at least one digital signal. The image processing device includes an input unit and an analog front end circuit with DC inputs. The input unit including no capacitors is used to receive the analog image signal. The analog front end circuit with DC inputs electrically coupled to the input unit includes at least one converting circuit, each of which at least includes an analog-to-digital converter and includes no clampers.

In a first embodiment, each converting circuit includes a level shifter and an analog-to-digital converter (ADC) and the level shifter is used to adjust the DC voltage level of the analog image signal. In a second embodiment and a third embodiment, each converting circuit includes an ADC and a compensation circuit. According to the second embodiment, the compensation circuit performs a clamping operation over the digital signal to generate a compensated digital signal based on a clock signal and a clamping signal. In the third embodiment, as the AFE circuit with DC inputs receives the analog image signal SOG or SOY, the ADC first converts the analog image signal SOG or SOY into its corresponding digital signal SOG or SOY. Next, the compensation circuit performs a sync signal acquisition over the digital signal SOG or SOY to generate a composite sync signal and then performs a clamping operation over the digital signal SOG or SOY to generate a compensated digital signal based on the clock signal and the clamping signal.

A feature of the invention is that no capacitor is installed in the input unit and no clamper is installed in the AFE circuit with DC inputs. Accordingly, the invention does not have the problem that a change in the DC voltage levels of the analog image signals can not be reflected immediately because it takes time for the restored DC voltage levels of the analog image signals to settle while performing AC-coupling and clamping. By selecting an appropriate comparing voltage and adding either a level shifter or a compensation circuit, the invention is still capable of generating accurate digital signals. Thus, since neither capacitor nor clamper is installed, the invention has greater flexibility in designing input buffers and even the input buffers can be eliminated (optional). Not only the number of components on a printed circuit board but also power consumption and size of the analog circuit are reduced; meanwhile, a better image quality is provided.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The image processing method and method thereof of the invention will be described with reference to the accompanying drawings.

Figure 1:
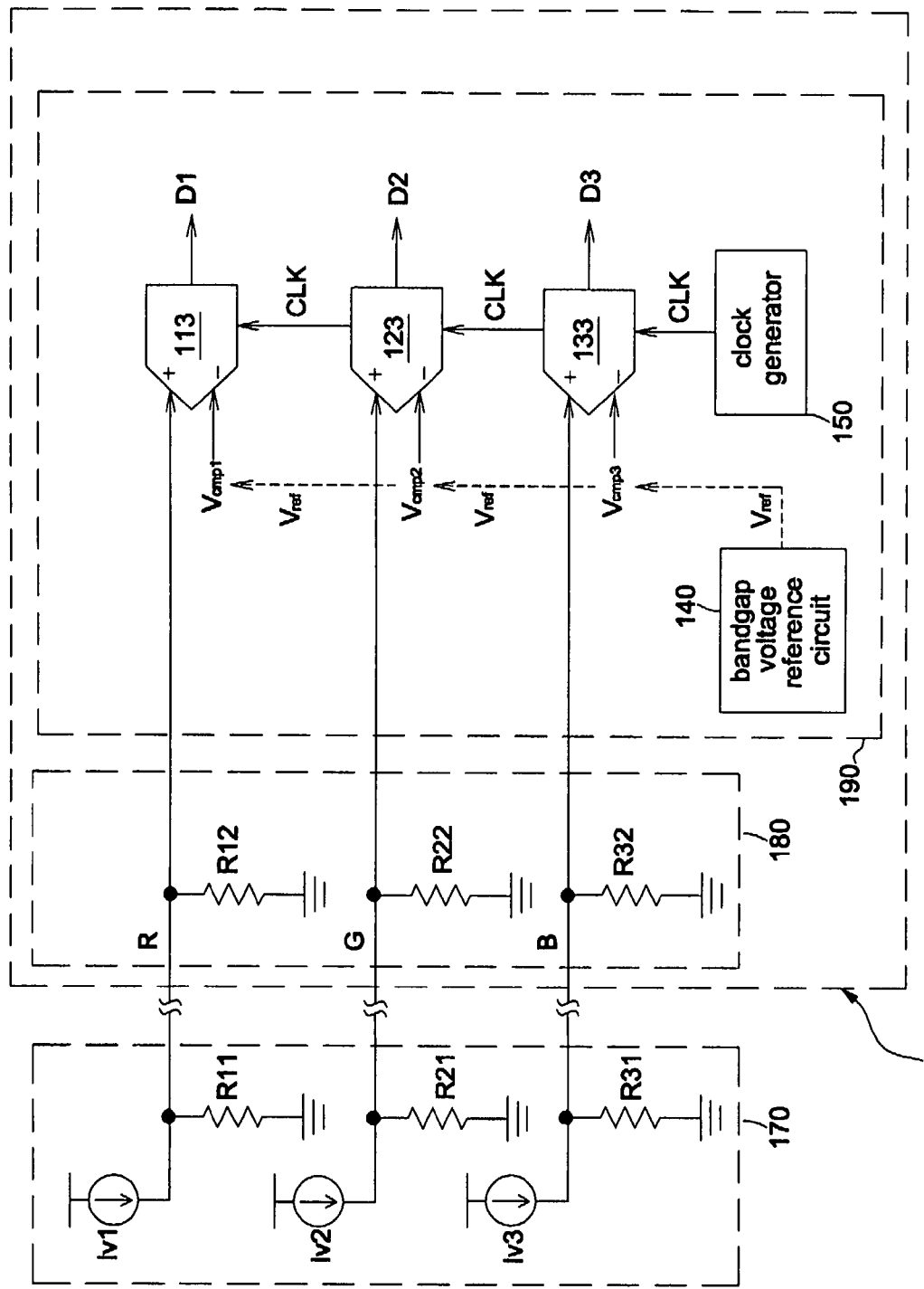
FIG. 1 shows a schematic circuit diagram illustrating an image processing device according to the invention.

FIG. 1 shows a schematic circuit diagram illustrating an image processing device according to the invention. Referring to FIG. 1, an image processing device 100 includes an input unit 180 and an AFE circuit 190 with DC inputs. The image processing device 100 is used to process at least one analog image signal (R, G, B) sent from a display card 170 to generate at least one digital signal (D1, D2, D3). The input unit 180 is disposed in a printed circuit board while the AFE circuit 190 with DC inputs is disposed in the LCD controller.

In order to implement DC inputs, no capacitor is installed in the input unit 180 and no camper is installed in the AFE circuit 190 with DC inputs. After receiving the analog image signals R, G, B fed from the display card 170, the input unit 180 shortly sends them to the AFE circuit 190 with DC inputs.

In addition to the analog image signal (R, G, B) fed from the display card 170, video formats of the image signals which are sent to the input unit 180 include a composite video signal (CVBS), a separate video signal (YC) and a component video signal (YPrPb), which are sent from a video data source system (e.g., a digital-to-analog converter). At this moment, the image processing device 100 is a portion of a TV system or other video display system. The AFE circuit 190 with DC inputs is disposed in a video decoder (not shown) while the input unit 180 is disposed on a printed circuit board. It should be noted, however, that the invention is not limited to the specific video formats described above, but fully extensible to any existing or yet-to-be developed video formats. That the image processing device 100 receives the analog image signals R, G, B from the display card 170 are taken as an example and will be described hereinafter.

The analog image signals R, G, B are delivered to the AFE circuit 190 with DC inputs via the input unit 180 for performing analog to digital conversion. As shown in FIG. 1, each signal path in the input unit 180 has a termination resistor (R12, R22, R23) (approximately 75Ω) for resolving the reflections of signals.

The AFE circuit 190 with DC inputs includes three ADCs 113, 123, 133, a bandgap voltage reference circuit 140 and a clock generator 150. The ADCs 113, 123, 133 respectively receive analog image signals R, G, B fed from the input unit 180 and perform analog to digital conversion to generate corresponding digital signals D1, D2, D3. Each ADC has a positive input terminal and a negative input terminal, where the positive input terminal receives an analog image signal (such as R) and the negative input terminal receives a comparing voltage (such as $V_{cmp1}$). According to a periodic clock signal CLK, each ADC converts a voltage difference between the two input terminals (if the ADC 113 is taken as an example, the voltage difference between its two input terminals is ($R-V_{cmp1}$); the voltage differences between the two input terminals of the other ADCs can be obtained likewise) into the digital signal (such as D1). Further, the clock generator 150 provides a periodic clock signal to the ADCs (113, 123, 133) for sampling. A reference voltage $V_{ref}$ generated by the bandgap voltage reference circuit 140, is provided to the ADCs (113, 123, 133) for adjusting their full-scale voltages or bias currents.

Circuit designers can dynamically adjust levels of the comparing voltages $V_{cmp1}$, $V_{cmp2}$, $V_{cmp3}$ by means of the reference voltage $V_{ref}$ outputted from the bandgap voltage reference circuit 140, hardware, software, firmware, or any combination thereof. As the ADC (113, 123, 133) is known to be producing black, the voltage difference between its two input terminals is then adjusted which results in the ADC (113, 123, 133) producing a digital output equal to zero (hereinafter called the "black calibration procedure"). After performing the black calibration procedure, the digital output of the ADC (113, 123, 133) (if the resolution of the ADCs is 8-bit) normally ranges from 0 to 255 and no converting shift occurs. For example, a converting shift occurs while the digital output of the ADC (113, 123, 133) ranges from 6 to 255 instead.

It is necessary for conventional circuits with AC-coupling and clamping to include an input buffer with high input impedance and high driving capability so as to prevent the restored DC voltage levels of the analog image signals from running. According to the invention, however, in the absence of AC-coupling and clamping, neither capacitor nor clamper is installed in the image processing device. Therefore, it is not necessary for the image processing device of the invention to include an input buffer, thereby saving space and hardware cost of the input buffer in conventional image processing devices as well as reducing power consumption and circuit size. Without AC-coupling and clamping, the invention directly provides the analog image signals R, G, B to the AFE circuit 190 with DC inputs; besides, the AFE circuit 190 with DC inputs has been set to perform the black calibration procedure for every pre-defined period in order to dynamically adjust levels of the comparing voltage $V_{cmp1}$, $V_{cmp2}$, $V_{cmp3}$, thereby ensuring the accuracy of the digital signals D1, D2, D3.

Figure 2A:
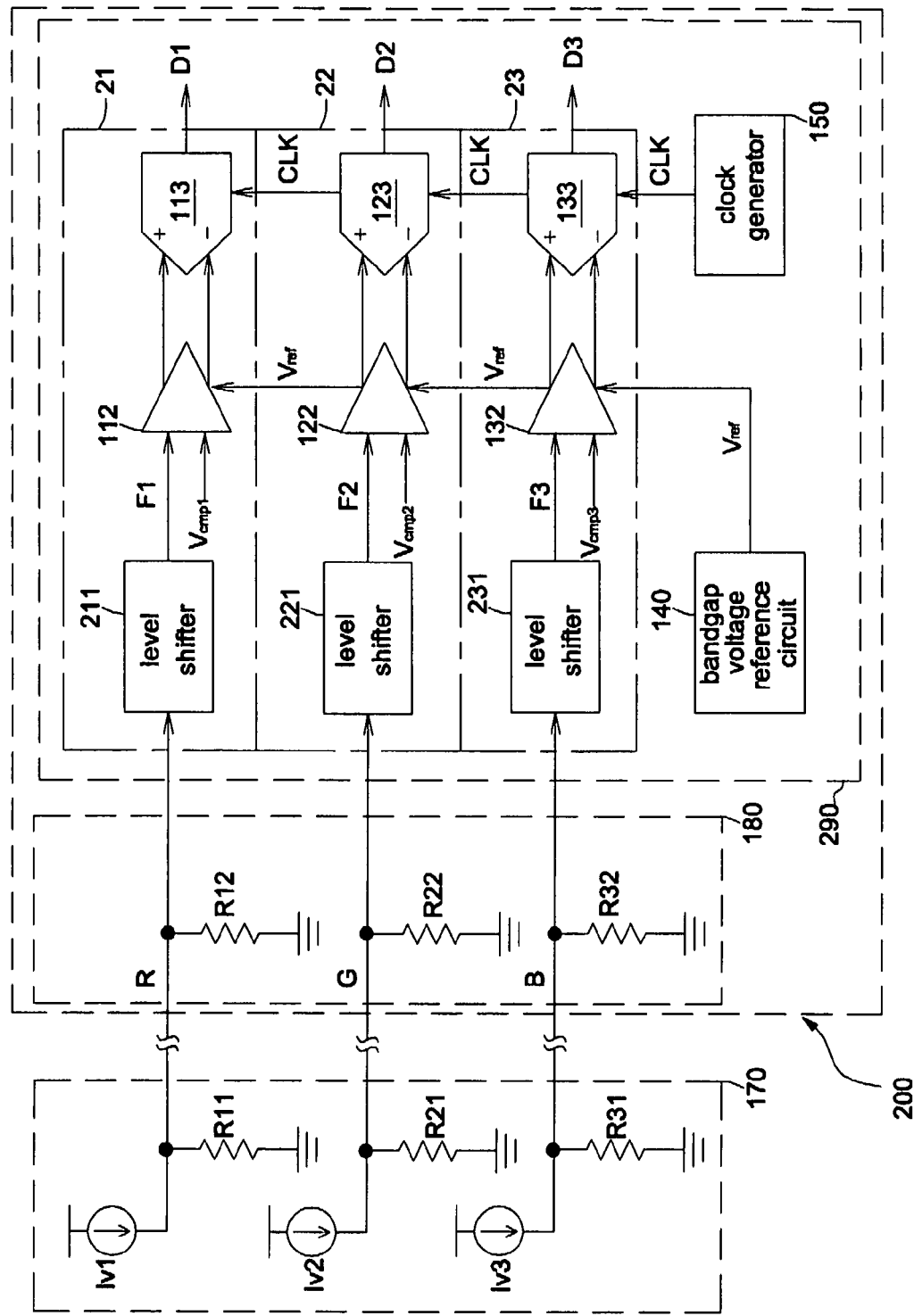
FIG. 2A is a block diagram illustrating an image processing device according to a first embodiment of the invention.

FIG. 2A is a block diagram illustrating an image processing device according to a first embodiment of the invention.

Figure 2B:
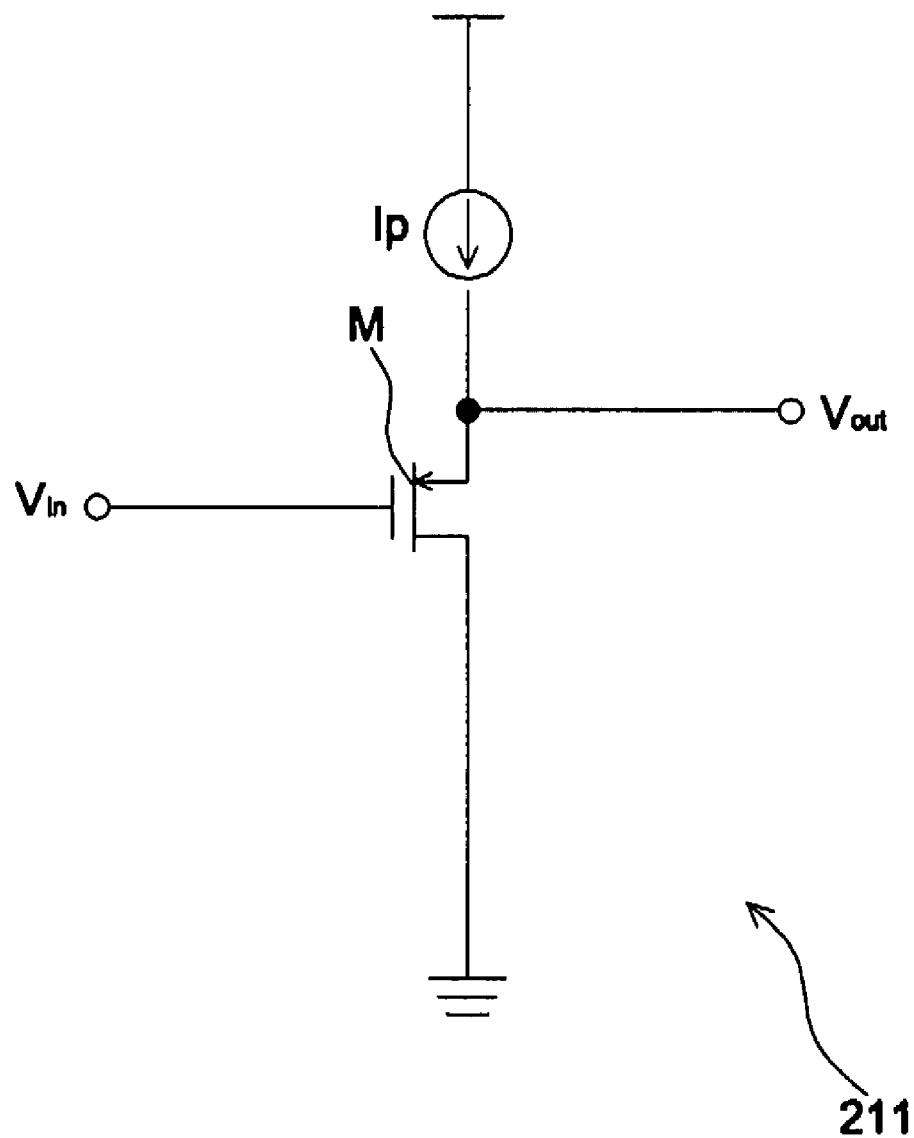
FIG. 2B is a circuit diagram illustrating a level shifter.

FIG. 2B is a circuit diagram illustrating a level shifter. In the first embodiment, an image processing device 200 includes the input unit 180 and an AFE circuit 290 with DC inputs. The AFE circuit 290 with DC inputs includes three identical converting circuits 21, 22, 23, a bandgap voltage reference circuit 140 and a clock generator 150. Each converting circuit (21, 22, 23) includes a level shifter (211, 221, 231), an input buffer (112, 122, 132) and an ADC (113, 123, 133). In comparison with the image processing device 100 in FIG. 1, each converting circuit in the image processing device 200 in FIG. 2A additionally includes a level shifter and an input buffer. It should be noted that the installation of the input buffers disclosed above is illustrative only. The invention is not limited to the specific circuit configuration described above, as the input buffers are optional. As the analog image signals R, G, B are delivered all the way from the display card 170 via a cable to the AFE circuit 290 with DC inputs, the amplitudes of the analog image signals R, G, B are usually attenuated to some extent. The invention utilizes the level shifters 211, 221, 231 to adjust the DC voltage levels of the analog image signals R, G, B and then generates lifted signals F1, F2, F3 after pulling up the DC voltage levels of the analog image signals R, G, B, respectively. Next, the lifted signals F1, F2, F3 and the comparing voltage $V_{cmp1}$, $V_{cmp2}$, $V_{cmp3}$ are respectively sent to the input buffer 112, 122, 132 for buffering. Afterward, the input buffer 112 simultaneously sends the lifted signal F1 and the comparing voltage $V_{cmp3}$ to the ADC 113; the input buffer 122 simultaneously sends the lifted signal F2; and, the comparing voltage $V_{cmp2}$ to the ADC 123 and the input buffer 132 simultaneously sends the lifted signal F3 and the comparing voltage $V_{cmp3}$ to the ADC 133. As a result, the ADC 113 converts a voltage difference (F1–$V_{cmp1}$) between its two input terminals into the digital signal D1; the ADC 123 converts a voltage difference (F2–$V_{cmp2}$) between its two input terminals into the digital signal D2 and the ADC 133 converts a voltage difference (F3–$V_{cmp3}$) between its two input terminals into the digital signal D3. Note that if any of the input signals of the level shifters (211, 221, 231) originally has a negative voltage, it will be pulled up to a certain positive voltage level by its corresponding level shifter, which is implemented using a current source $I_p$ in series connection with a PMOS transistor M (as shown in FIG. 2B).

In comparison to the AFE circuit 190 with DC inputs, the AFE circuit 290 with DC inputs includes the level shifters additionally so that each ADC (113, 123, 133) can adjust not only the level of the comparing voltage but also the DC voltage level of the analog image signal while adjusting a voltage difference between its two input terminals, thereby providing considerable flexibility in adjusting the voltage difference. In the first embodiment, by appropriately selecting the DC voltage levels pulled up by the level shifters 211, 221, 231 and adjusting the levels of the comparing voltages $V_{cmp1}$, $V_{cmp2}$, $V_{cmp3}$, the ADC (113, 123, 133) is allowed to adjust the voltage difference between its two input terminals while producing (or calibrating) a black output so that the digital output of the ADC (113, 123, 133) is equal to zero. Thus, after accomplishing the black calibration procedure, the ADC (113, 123, 133) proceeds to receive the subsequent analog image signals and perform the analog to digital conversion. On condition that the ADC has a correct gain range, the digital output of the ADC (113, 123, 133) will be within the range of 0-255 (if the resolution of the ADCs is 8-bit).

Figure 3:
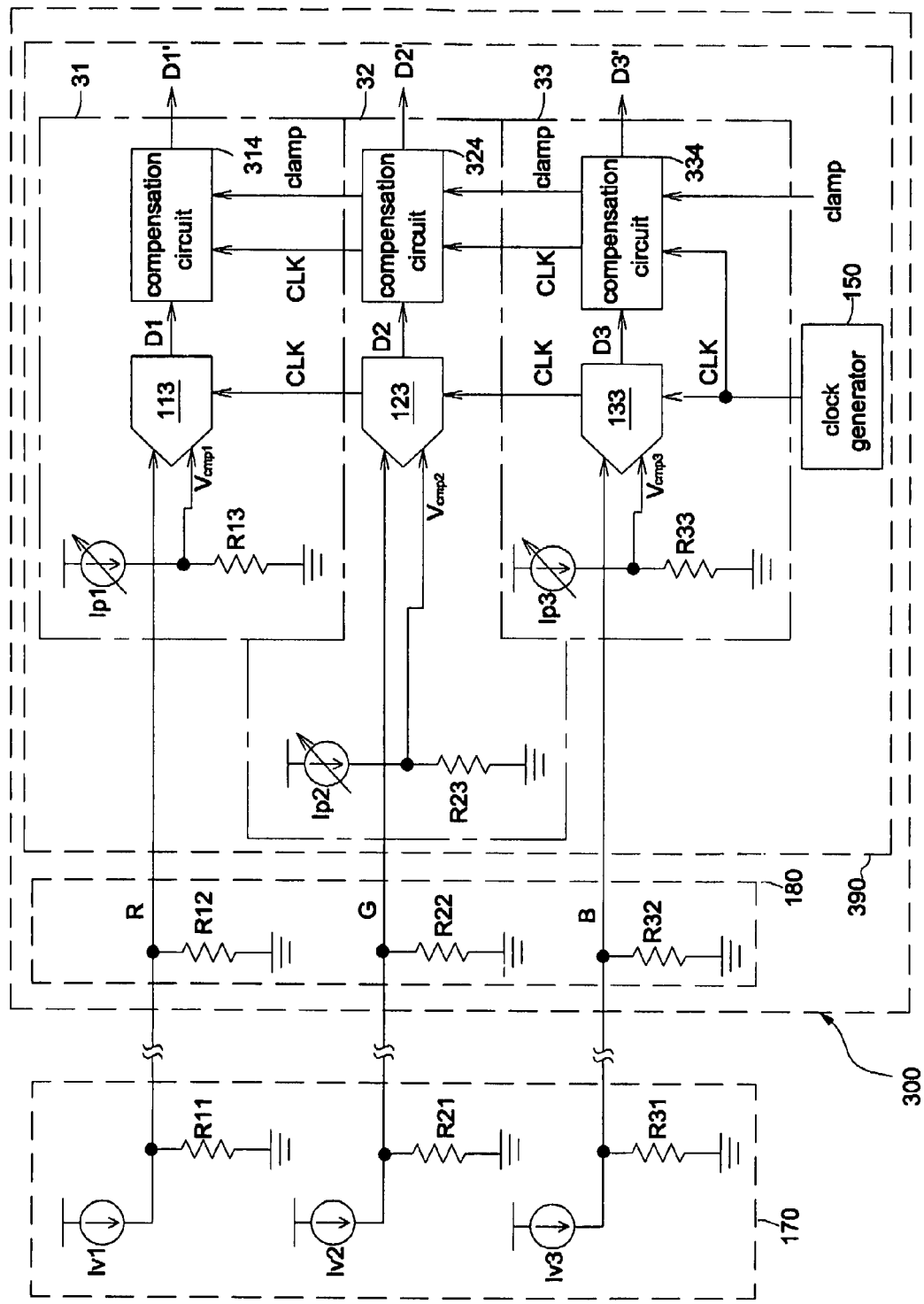
FIG. 3 is a block diagram illustrating an image processing device according to a second embodiment of the invention.

FIG. 3 is a block diagram illustrating an image processing device according to a second embodiment of the invention. According to the second embodiment, an image processing device 300 includes the input unit 180 and an AFE circuit 390 with DC inputs. The AFE circuit 390 with DC inputs includes three identical converting circuits 31, 32, 33, a bandgap voltage reference circuit 140 (not shown) and a clock generator 150. Each converting circuits (31, 32, 33) includes an ADC (113, 123, 133) and a compensation circuit (314, 324, 334). Wherein, the comparing voltage $V_{cmp1}$ provided to the ADC 113 is implemented using a variable current source $I_{p3}$ in series connection with a resistor R13; the comparing voltage $V_{cmp2}$ provided to the ADC 123 is implemented using a variable current source $I_{p2}$ in series connection with a resistor R23 and the comparing voltage $V_{cmp3}$ provided to the ADC 133 is implemented using a variable current source $I_{p3}$ in series connection with a resistor R33.

Suppose that the circuit is in a bad condition. That is, after the black calibration procedure is performed, the ADCs 113, 123, 133 can not generate a digital output equal to zero by means of adjusting the comparing voltages $V_{cmp1}$, $V_{cmp2}$, $V_{cmp3}$. The second embodiment additionally includes compensation circuits 314, 324, 334, which performs clamping over the digital signals D1, D2, D3 based on the clock signal (CLK) and the clamping signal (clamp) to ensure the accurate generation of compensated digital signals D1', D2', D3'. For example, suppose that the digital signals D1, D2, D3 generated by the ADCs 113, 123, 133 are within the range of 10-255 (if the resolution of the ADCs is 8-bit), which may result from either a wrong setting of the comparing voltages $V_{cmp1}$, $V_{cmp2}$, $V_{cmp3}$ or a nonlinear characteristic of the ADC itself. At this moment, a relatively reliable method is using compensation circuits 314, 324, 334, which identify the output timing of the digital signals D1, D2, D3 based on the clock signal (CLK) and simultaneously calibrate the black voltage levels based on the clamping signal (clamp). This ensures that the accurate compensated digital signals D1', D2', D3' can be obtained after the digital signals D1, D2, D3 respectively pass through the compensation circuits 314, 324, 334. The method described above is called the "DC restoration in digital domain". According to the invention, the first embodiment and the second embodiment are adapted to receive analog image signals without containing SOG or SOY signals, such as analog image signals (R, G, B). A third embodiment of the invention, as hereinafter provided, is adapted to receive analog image signals containing SOG or SOY signals, such as analog image signals (R, SOG, B), analog image signals (SOY, Pr, Pb), a composite video signal (CVBS), or a separate video signal (Y, C).

Figure 4:
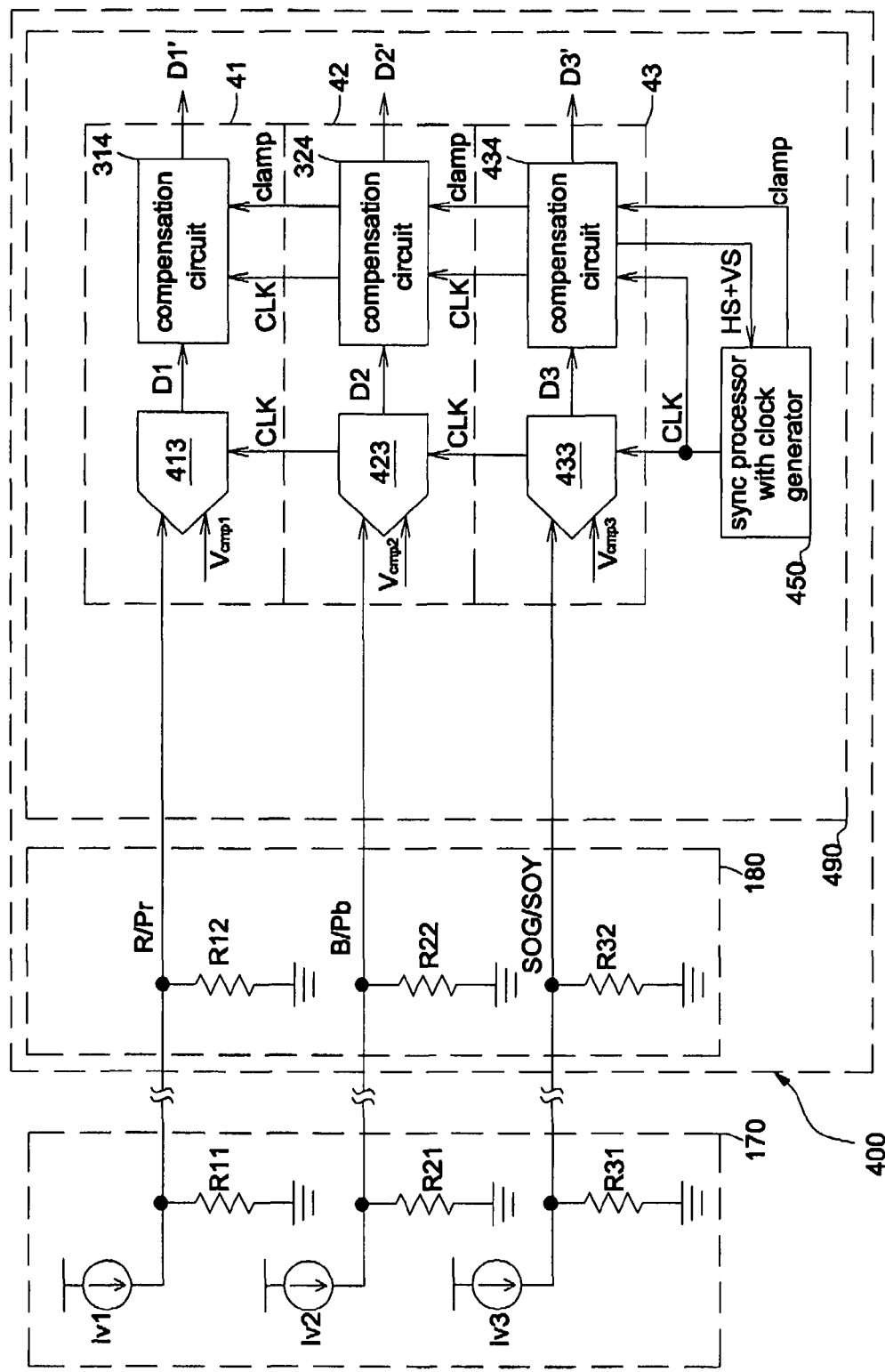
FIG. 4 is a block diagram illustrating an image processing device according to a third embodiment of the invention.
Figure 5:
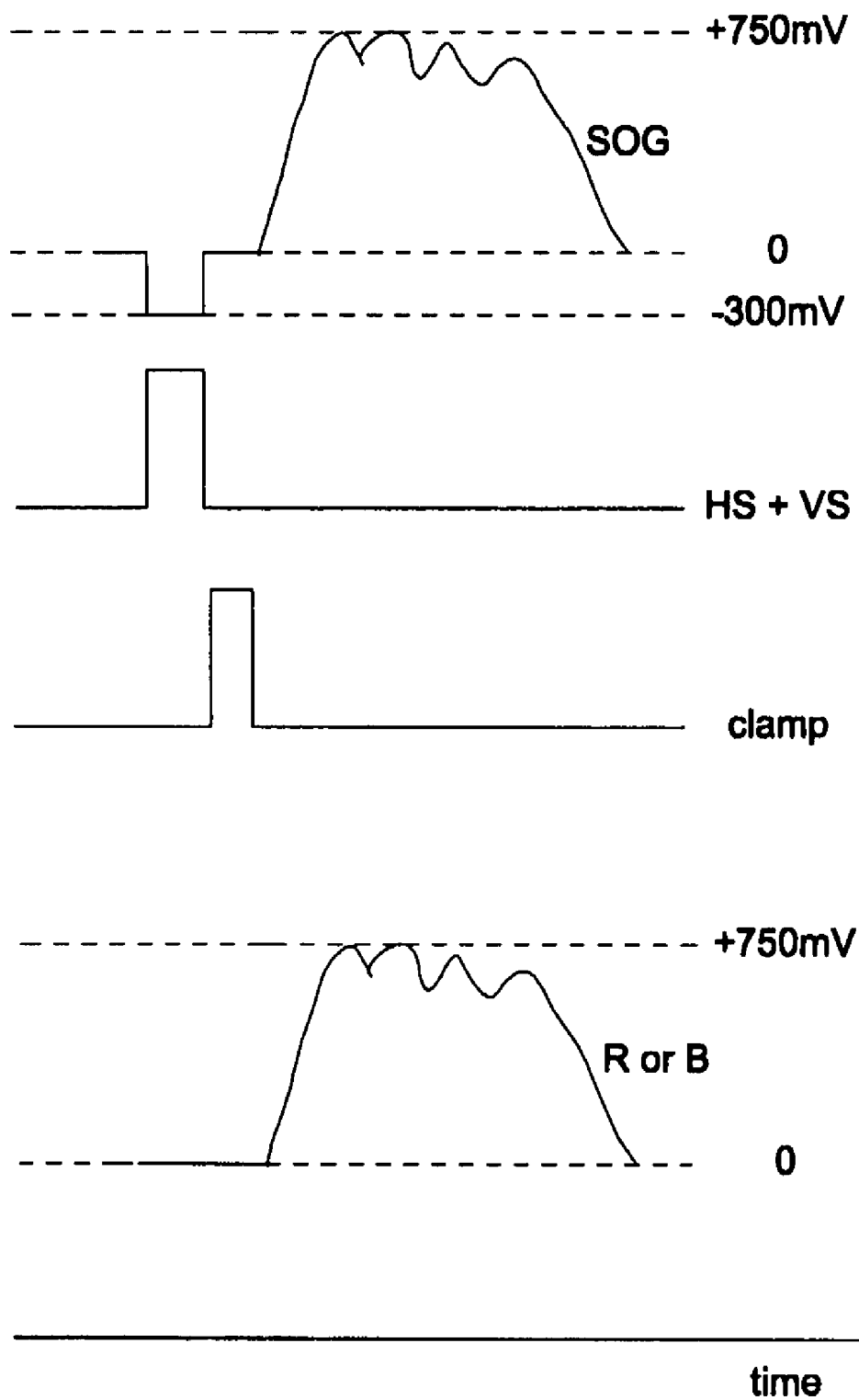
FIG. 5 is a timing diagram showing waveforms of analog image signals (R, SOG, B), a composite sync signal (HS+VS) and a clamping signal (clamp).

FIG. 4 is a block diagram illustrating an image processing device according to a third embodiment of the invention. FIG. 5 is a timing diagram showing waveforms of analog image signals (R, SOG, B), a composite sync signal (HS+VS) and a clamping signal (clamp).

A feature of the invention is that no capacitor is installed in the input unit and no clamper is installed in the AFE circuit with DC inputs, which is allowed for the analog image signals to be directly sent to the AFE circuit with DC inputs. Accordingly, without AC-coupling and clamping performed by a conventional SOG (or SOY) branch (including an AC-coupling capacitor and a SOG circuit), an image processing device in the third embodiment integrates tasks that are originally carried out by the conventional SOG (or SOY) branch into the compensation circuit 434 while receiving the analog image signal SOG (or SOY) to extract the composite sync signal (HS+VS), causing the compensation circuit 434 to perform the extraction of the composite sync signal (HS+VS) as well. Hereinafter, the operations and the structure of the third embodiment will be described in detail as the image processing device 400 receiving the analog image signals R, G, B are taken as an example.

Referring to FIG. 4, an image processing device 400 includes the input unit 180 and an AFE circuit 490 with DC inputs. The AFE circuit 490 with DC inputs includes three identical converting circuits 41, 42, 43 and a sync processor with clock generator 450. Each converting circuit (41, 42, 43) includes an ADC (413, 423, 433) and a compensation circuit (314, 324, 434). The ADCs 413, 423, 433, different from the ADCs 113, 123, 133, have a larger input voltage range. Conventionally, the analog image signals R, B passing through AC-coupling capacitors and clampers range from 0 to 750 mV (as shown in FIG. 5) while the analog image signal SOG ranges from −300 mV to 750 mV. Accordingly, an effective number of bits (ENOB) (or resolution) that the ADCs 413, 423, 433 support need to be increased. However, in practical, only the effective number of bits that the ADC 433 need to be increased, e.g., from 8-bit to 10-bit; otherwise, the image quality or resolution will be worsen. The operations of the input unit 180 and the converting circuits 41, 42 in the third embodiment are the same as those of the input unit 180 and the converting circuits 31, 32 in the second embodiment and thus will not be described herein.

As to the converting circuit 43, the ADC 433 receives the analog image signal SOG and then performs the analog to digital conversion to generate the digital signal D3. The operations of the compensation circuit 434 and the sync processor with clock generator 450 will be detailed as follows. After receiving the analog image signal SOG, the compensation circuit 434 extracts the composite sync signal HS+VS from the analog image signal SOG and then sends it to the sync processor with clock generator 450. Next, after receiving the composite sync signal HS+VS, the sync processor with clock generator 450 firstly generates two sync signals HS, VS and a clamping signal (clamp) and then generates a periodic clock signal CLK to be sent to the compensation circuits 314, 324, 434 based on the two sync signals HS, VS. Afterwards, the compensation circuit 434 performs a clamping operation over the digital signal D3 to generate a compensated digital signal D3' based on the clock signal CLK and the clamping signal (clamp).

According to the invention, the compensation circuit 434 is divided into a sync signal acquisition unit and a clamping unit (not shown). The sync signal acquisition unit is adapted to extract sync pulses from the digital signal D3 in order to generate the composite sync signal HS+VS, whereas the clamping unit is adapted to perform a clamping operation over the digital signal D3 based on the clock signal CLK and the clamping signal (clamp) generated by the sync processor with clock generator 450. Suppose that the resolution of the ADC 433 is 10-bit and a digital signal D3 ranging from 0 to 292 represents the "negative pulse (or peak)" of the analog image signal SOG ranging from −300 mV to 0, and that a digital signal D3 ranging from 293 to 1023 represents the "image data" of the analog image signal SOG ranging from 0 to 750 mV. At start-up, a comparing value (such as 150) is first set into the sync signal acquisition unit (instead of a comparator in a conventional SOG circuit) in order that the composite sync signal HS+VS can be extracted. Suppose that the digital signals that the sync signal acquisition unit receives are less than 150 within a pre-defined period, which means that a "negative pulse" of the analog image signal SOG arrives. The sync signal acquisition unit shortly sets the voltage of the composite sync signal HS+VS, originally at a low voltage potential, to 1 until the "negative pulse" of the analog image signal SOG is accomplished. Then, the voltage of the composite sync signal HS+VS is set back to 0. In the meantime, the composite sync signal HS+VS is delivered to the sync processor with clock generator 450 for generating the clock signal CLK and the clamping signal (clamp).

Suppose that digital signals D1, D2, D3 ranging from 293 to 1023 represent the "image data" of the analog image signal R, B, SOG ranging from 0 to 750 mV. The compensation circuits 314, 324 and the clamping unit in the compensation circuit 434 identify the output timing of the digital signals D1, D2, D3 based on the clock signal (CLK) and calibrate the black voltage levels based on the clamping signal (clamp), ensuring that the accurate compensated digital signals D1', D2', D3' can be obtained after the digital signals D1, D2, D3 respectively pass through compensation circuits 314, 324, 434 (e.g., the compensated digital signals D1', D2', D3' being adjusted to fit the range of 0-255).

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image processing device for receiving at least one analog image signal and generating at least one digital signal, comprising:
   an input unit comprising at least one signal path, each signal path being equipped with at least one terminator resistor, each signal path being without a capacitor, the input unit transferring one of the at least one analog image signal; and
   an analog front end circuit with DC inputs electrically coupled to the input unit and comprising at least one converting circuit, each converting circuit being without a damper and at least comprising an analog-to-digital converter, each analog-to-digital converter receiving one of the at least one analog image signal and a comparing voltage to generate the digital signal according to a clock signal.

2. The image processing device according to claim 1, the analog front end circuit with DC inputs further comprising:
   a bandgap voltage reference circuit for supplying a reference voltage to each analog-to-digital converter; and
   a clock generator for providing the clock signal.

3. The image processing device according to claim 2, the reference voltage being used to adjust the comparing voltage.

4. The image processing device according to claim 2, each converting circuit further comprising a compensation circuit positioned after the analog-to-digital converter for performing a clamping operation to generate a compensated digital signal.

5. The image processing device according to claim 4, the analog front end circuit with DC inputs further comprising:
   a bandgap voltage reference circuit for supplying a reference voltage to each analog-to-digital converter; and
   a sync processor with clock generator for receiving a composite sync signal and generating the clock signal and the clamping signal.

6. The image processing device according to claim 1, each converting circuit further comprising:
   a variable current source; and
   a resistor coupled to the variable current source, wherein a junction of the resistor and the variable current source generates the comparing voltage.

7. The image processing device according to claim 1, the each analog-to-digital converter with two input terminals converting a voltage difference between the two input terminals into the digital signal.

8. The image processing device according to claim 1, receiving three analog image signals sent from a display card.

9. The image processing device according to claim 1, the analog front end circuit with DC inputs being disposed in a liquid crystal display controller.

10. The image processing device according to claim 1, the analog front end circuit with DC inputs being disposed in a video controller and comprises the at least one converting circuit.

11. The image processing device according to claim 1, each converting circuit further comprising a level shifter for adjusting a DC voltage level of the analog image signal.

12. The image processing device according to claim 11, the level shifter comprising:
 a constant current source; and
 a transistor having its gate receiving the analog image signal, its source coupled to the constant current source and the analog-to-digital converter and its drain coupled to ground.

13. An image processing method applied in an image processing device, comprising:
 transferring at least one analog image signal without using a capacitor;
 adjusting a DC voltage level of the at least one analog image signal without using a damper;
 generating a digital signal according to the at least one analog image signal and a comparing voltage by an analog-to-digital converter; and
 performing a clamping operation over the digital signal to generate a compensated digital signal according a clock signal and a clamping signal by a compensation circuit.

14. The image processing method according to claim 13, further comprising:
 generating a reference voltage; and
 adjusting the comparing voltage according to the reference voltage.

15. The image processing method according to claim 13, further comprising:
 receiving the digital signal and performing a sync signal acquisition to generate a composite sync signal; and
 generating the clock signal and the clamping signal according to the composite sync signal.

16. The image processing method according to claim 13, the step of adjusting further comprising:
 adjusting the DC voltage level of the at least one analog image signal by a level shifter.

\* \* \* \* \*